(12) United States Patent
Yatsunami

(10) Patent No.: US 10,979,587 B2
(45) Date of Patent: Apr. 13, 2021

(54) RECORDING APPARATUS

(71) Applicant: SEIKO EPSON CORPORATION, Tokyo (JP)

(72) Inventor: Tetsuji Yatsunami, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/773,089

(22) Filed: Jan. 27, 2020

(65) Prior Publication Data

US 2020/0244829 A1    Jul. 30, 2020

(30) Foreign Application Priority Data

Jan. 30, 2019  (JP) .............................. JP2019-014057

(51) Int. Cl.
| | |
|---|---|
| *H04N 1/00* | (2006.01) |
| *B41J 13/00* | (2006.01) |
| *B41J 3/60* | (2006.01) |
| *B41J 13/10* | (2006.01) |
| *B41J 11/00* | (2006.01) |

(52) U.S. Cl.
CPC ............ *H04N 1/00538* (2013.01); *B41J 3/60* (2013.01); *B41J 11/006* (2013.01); *B41J 13/0045* (2013.01); *B41J 13/103* (2013.01); *H04N 1/00546* (2013.01)

(58) Field of Classification Search
CPC ........ B41J 13/0045; B41J 3/60; B41J 13/103; B41J 11/006; H04N 1/00538; H04N 1/00546

See application file for complete search history.

(56) References Cited

U.S. PATENT DOCUMENTS

2002/0072947 A1    6/2002  Nakamura
2013/0050378 A1*   2/2013  Okamoto .............. B41J 11/006
                                                  347/104

FOREIGN PATENT DOCUMENTS

| JP | 2001-312478 | 11/2001 |
| JP | 2003-122072 | 4/2003 |
| JP | 2007-225665 | 9/2007 |

* cited by examiner

*Primary Examiner* — Geoffrey S Mruk
(74) *Attorney, Agent, or Firm* — Workman Nydegger

(57) ABSTRACT

A recording apparatus includes a reverse path for reversing a surface of a medium, a second medium transport path for guiding the medium on which recording has been performed to the reverse path, a third medium transport path which is positioned vertically below the second medium transport path and guides the medium on which recording has been performed to the reverse path, in which a first path forming portion that forms the reverse path, a second path forming portion that forms a part of an upper side of the second medium transport path, and a third path forming portion that forms a part of an upper side of the third medium transport path are constituted to be attachable and detachable as a unit body, and a part of the second medium transport path and a part of the third medium transport path are exposed by removing the unit body.

7 Claims, 9 Drawing Sheets

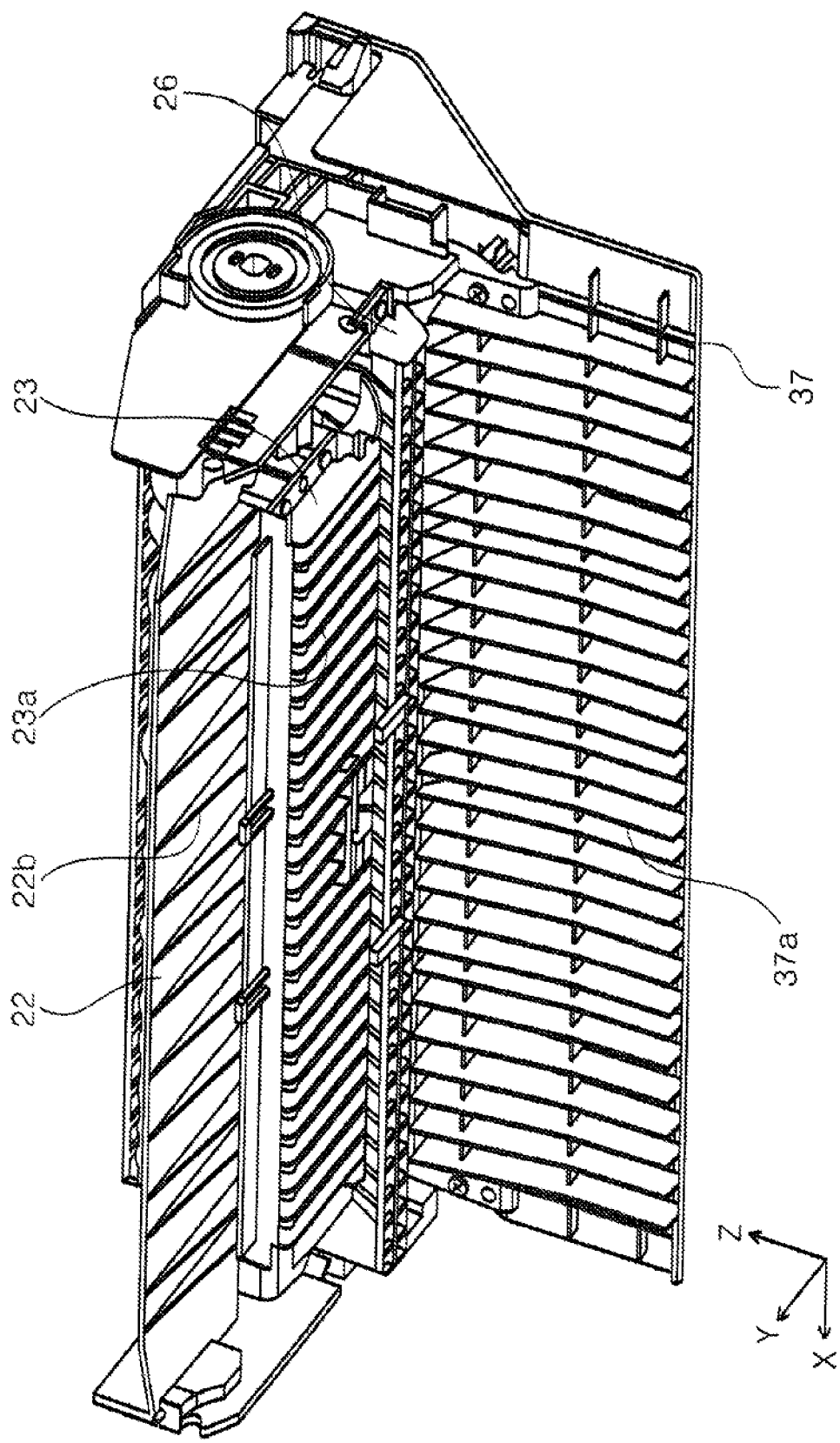

RECORDING APPARATUS

The present application is based on, and claims priority from JP Application Serial Number 2019-014057, filed Jan. 30, 2019, the disclosure of which is hereby incorporated by reference herein in its entirety.

BACKGROUND

1. Technical Field

The present disclosure relates to a recording apparatus that performs recording on a medium.

2. Related Art

Some recording apparatuses as typified by facsimiles, printers, and the like include a path for reversing paper in order to perform recording on both sides of the paper, which is an example of a medium. JP-A-2003-122072 discloses an image forming apparatus including an image forming transport path in which an image is formed on one side of paper to be transported, a reverse transport path in which the transport direction of the paper selectively introduced downstream of the image forming transport path is reversed, a return path through which the paper reversely transported from the reverse transport path is returned below the image forming transport path with the same front and back orientation, and a reverse transport path in which the paper returned through the return path is reversed and re-loaded upstream of the image forming transport path.

In the image forming apparatus disclosed in JP-A-2003-122072, a transport unit is detachably attached to a printer body, and the above-described return path and reverse transport path are formed in the transport unit. By pulling out the transport unit from the printer main body, the return path and the reverse transport path can be visually observed from the side of the transported transport unit. If it is confirmed that a paper jam has occurred on the return path or the reverse transport path, the return path and the reverse transport path are widely opened when an auxiliary unit constituting the transport unit is opened upward, and jam processing can be easily performed.

In the image forming apparatus disclosed in JP-A-2003-122072, even if the transport unit is pulled out from the printer body, the return path and the reverse transport path are not widely opened as they are, and in particular, even if a small size paper is jammed, the jam may not be visible. Further, in order to more surely check whether there is a paper jam in the return path or the reverse transport path, it is necessary to open the auxiliary unit after the transport unit is pulled out, which is troublesome.

SUMMARY

According to an aspect of the present disclosure, there is provided a recording apparatus including a recording unit that performs recording on a medium, a first medium transport path that is a medium transport path facing the recording unit that may transport a medium in a first direction that is a medium transport direction when recording is performed on the medium and in a second direction opposite to the first direction, a reverse path for reversing a surface of the medium, a second medium transport path for guiding the medium on which recording has been performed by the recording unit to the reverse path, and a third medium transport path different from the second medium transport path, which is positioned vertically below the second medium transport path and guides the medium on which recording has been performed by the recording unit to the reverse path, in which a first path forming portion that forms the reverse path, a second path forming portion that forms a part of an upper side of the second medium transport path, and a third path forming portion that forms a part of an upper side of the third medium transport path are constituted to be attachable to and detachable from an apparatus main body including the recording unit as a unit body and a part of the second medium transport path and a part of the third medium transport path are exposed by removing the unit body from the apparatus main body.

BRIEF DESCRIPTION OF THE DRAWINGS

FIG. 9 is a perspective view of the unit body as viewed obliquely from below.

DESCRIPTION OF EXEMPLARY EMBODIMENTS

Figure 1:
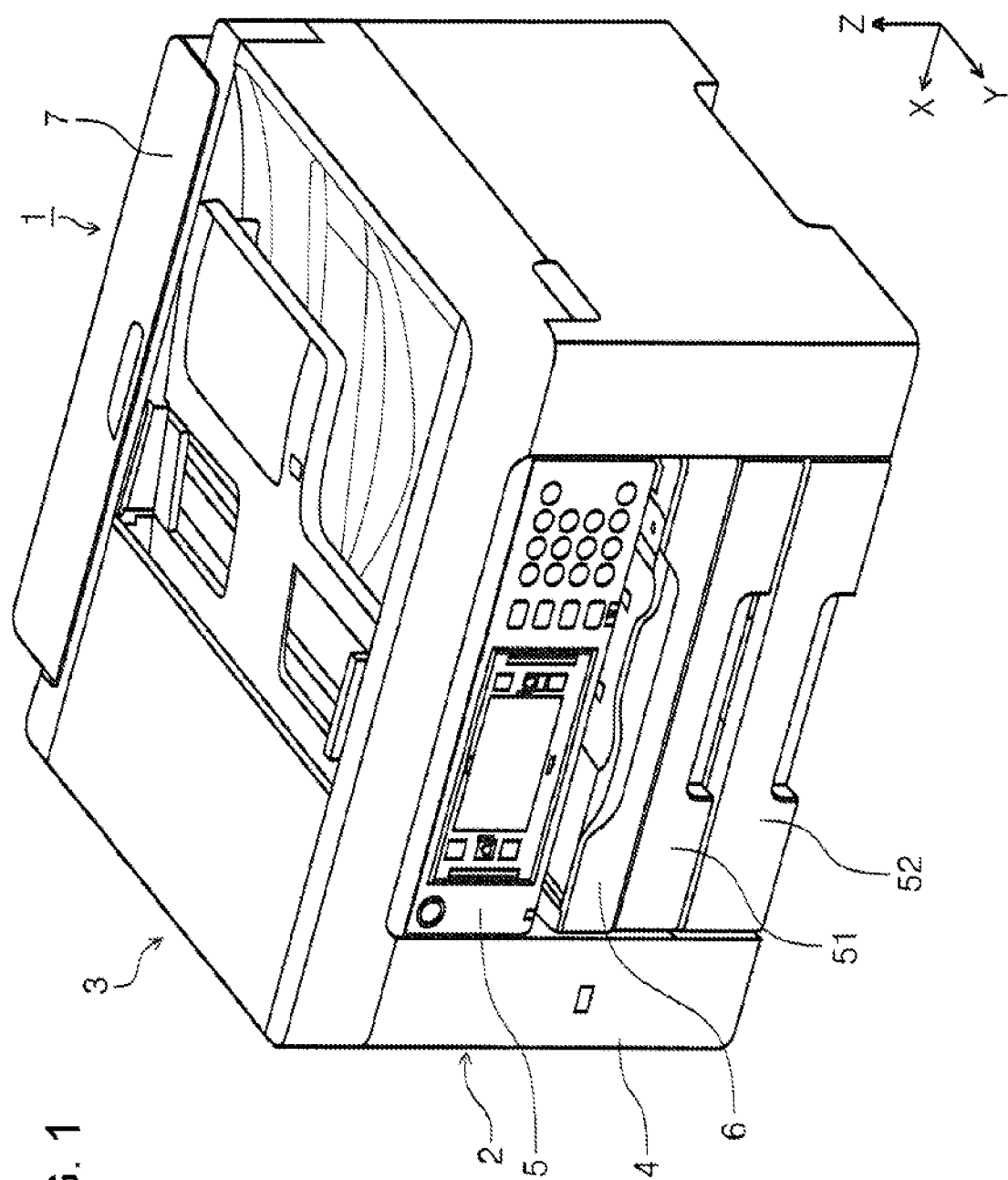
FIG. 1 is a perspective view of a printer as viewed from the front.

The present disclosure will be schematically described below. A recording apparatus according to a first aspect includes a recording unit that performs recording on a medium, a first medium transport path that is a medium transport path facing the recording unit and transports a medium in a first direction that is a medium transport direction when recording is performed on the medium and in a second direction opposite to the first direction, a reverse path for reversing a surface of the medium, a second medium transport path for guiding the medium on which recording has been performed by the recording unit to the reverse path, and a third medium transport path different from the second medium transport path, which is positioned vertically below the second medium transport path and guides the medium on which recording has been performed by the recording unit to the reverse path, in which a first path forming portion that forms the reverse path, a second path forming portion that forms a part of an upper side of the second medium transport path, and a third path forming portion that forms a part of an upper side of the third medium transport path are constituted to be attachable to and detachable from an apparatus main body including the recording unit as a unit body, and the part of the second medium transport path and the part of the third medium transport path are exposed by removing the unit body from the apparatus main body.

Since the third medium transport path is positioned vertically below the second medium transport path, it is difficult to check whether the medium is jammed, but in the recording apparatus, by removing the unit body from the apparatus main body, in addition to the part of the second medium transport path, the part of the third medium transport path is exposed, and in addition to the second medium transport path, it is possible to quickly and easily check whether the medium is jammed in the third medium transport path, and the jammed medium can be removed quickly and easily.

A second aspect of the present disclosure provides the recording apparatus according to the first aspect, in which the third path forming portion forms a part of a lower side of the second medium transport path, and by removing the unit body from the apparatus main body, a fourth path forming portion that forms a part of a lower side of the third medium transport path is exposed to the front side when viewed from the removing direction of the unit body, and a fifth path forming portion that forms a part of the lower side of the second medium transport path is exposed at a position inside with respect to the fourth path forming portion to be exposed.

In the recording apparatus, by removing the unit body from the apparatus main body, a fourth path forming portion that forms a part of a lower side of the third medium transport path is exposed to the front side when viewed from the removing direction of the unit body, and a fifth path forming portion that forms a part of the lower side of the second medium transport path is exposed at a position inside with respect to the fourth path forming portion to be exposed, thereby improving visibility of the part of the third medium transport path positioned below the second medium transport path.

A third aspect of the present disclosure provides the recording apparatus according to the second aspect, which further includes a sixth path forming portion that forms a lower side of a portion coupled to the reverse path in the third medium transport path, in which the sixth path forming portion constitutes the unit body.

Since the recording apparatus includes the sixth path forming portion that forms the lower side of the portion coupled to the reverse path in the third medium transport path and the sixth path forming portion constitutes the unit body, the sixth path forming portion is also removed from the apparatus main body by removing the unit body, and the jam of the medium in the third medium transport path can be checked more easily, and the jammed medium can be easily removed.

A fourth aspect of the present disclosure provides the recording apparatus according to the third aspect, which further includes a medium accommodating cassette that is positioned vertically below the third medium transport path and that may accommodate a medium and is attachable to and detachable from the apparatus main body, and a seventh path forming portion that forms a part of the lower side of the third medium transport path and is farther from the reverse path than the fourth path forming portion, in which the seventh path forming portion is displaceable downward in a state in which the medium accommodating cassette is removed from the apparatus main body.

In the recording apparatus, since the seventh path forming portion that forms a part of the lower side of the third medium transport path and is farther from the reverse path than the fourth path forming portion may be displaced downward, when a medium jam occurs at a position farther from the reverse path than the fourth path forming portion in the third medium transport path, the jammed medium can be removed.

A fifth aspect of the present disclosure provides the recording apparatus according to the third aspect, which further includes a medium accommodating cassette that is positioned vertically below the third medium transport path and that may accommodate a medium and is attachable to and detachable from the apparatus main body, in which a part of the medium accommodating cassette is exposed by removing the unit body from the apparatus main body.

The recording apparatus further includes a medium accommodating cassette that is positioned vertically below the third medium transport path and that may accommodate a medium and is attachable to and detachable from the apparatus main body, in which a part of the medium accommodating cassette is exposed by removing the unit body from the apparatus main body.

A sixth aspect of the present disclosure provides the recording apparatus according to the first to the fifth aspects, in which in the unit body of the recording apparatus, at least a part of the reverse path is formed by a plurality of ribs arranged at intervals in a width direction, which is a direction intersecting a feeding direction of the medium.

In the recording apparatus, since at least a part of the reverse path in the unit body is formed by a plurality of ribs arranged at intervals in a width direction that is a direction intersecting a feeding direction of the medium, it is easy to visually recognize the jam of the medium occurring inside the path, and the jammed medium can be easily removed if the interval between the adjacent ribs is an interval at which a finger may be inserted.

Hereinafter, the present disclosure will be specifically described. In each drawing, the direction along the X axis is the apparatus width direction, which is the direction intersecting a paper transport direction, that is, a paper width direction. The −X direction is the right direction when viewed from a user when the front of the apparatus faces the user, and a +X direction is the left direction. The direction along the Y axis is the apparatus depth direction, and the +Y direction is the direction from the back of the apparatus to the front, which is a first direction. The −Y direction is the direction from the front to the back of the apparatus, which is a second direction. The direction along the Z axis is the vertical direction, the +Z direction is vertically upward, and the −Z direction is vertically downward. In the present embodiment, among the side surfaces that form the periphery of the apparatus, the side surface on which an operation unit 5 is provided is the front surface of the apparatus.

In FIG. 1, an ink jet printer 1 which is an example of a recording apparatus is a so-called multi-function machine including a scanner unit 3 above an apparatus main body 2. Hereinafter, the ink jet printer is abbreviated as "printer". The apparatus main body 2 has a function of recording on recording paper that is an example of a medium, and the scanner unit 3 has a function of reading a document. The scanner unit 3 includes an automatic document feeding mechanism (ADF: Auto Document Feeder) that automatically feeds a set document.

The apparatus main body 2 includes a transport path (described later) for transporting recording paper and a recording head 9 (FIG. 2) as an example of a recording unit, and includes two medium accommodating cassettes, specifically, a first paper cassette 51 and a second paper cassette 52 that are attachable and detachable in the embodiment.

The apparatus main body 2 is configured to be able to set and feed a sheet from the back of the apparatus in addition to setting sheets to the first paper cassette 51 and the second paper cassette 52. Reference numeral 7 denotes a cover for opening and closing a paper setting opening (not shown) when setting paper from the back of the apparatus.

The apparatus main body 2 includes the operation unit 5 that performs various operations of the printer 1 on the front surface of the apparatus. The operation unit 5 includes a display unit and a plurality of operation buttons, and is provided so as to be tilted. On the lower side of the operation unit 5, there is provided a discharge tray 6 for receiving recording paper that is recorded and discharged. As shown in FIG. 1, the discharge tray 6 is provided so as to be accommodated inside the apparatus main body 2 and to be pulled out from the apparatus main body 2 (not shown).

Figure 2:
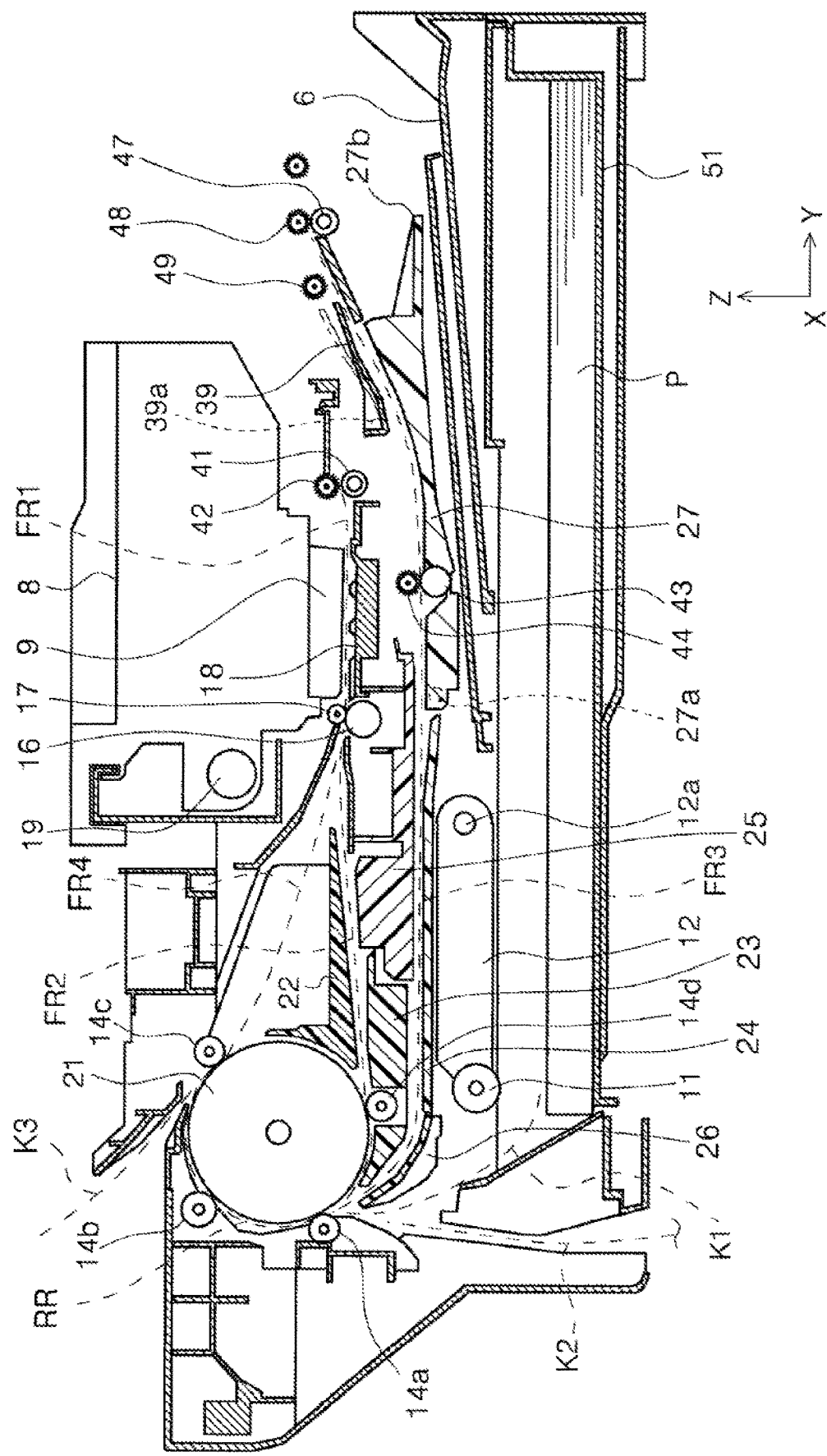
FIG. 2 is a side cross-sectional view showing an entire paper transport path of the printer and shows a state in which a unit body is mounted.

Next, the transport path of the recording paper will be described with reference to FIG. 2. In FIG. 2, the illustration of the second paper cassette 52 is omitted. In the printer 1, regardless of the feeding path, the recording paper is transported to a transport drive roller 16 via a reverse roller 21 constituting a reverse path RR and is transported to the recording area by a recording head 9 by the transport drive roller 16.

More specifically, the printer 1 includes a paper feeding path K1 for feeding recording paper from the first paper cassette 51 as a paper feeding path, a paper feeding path K2 for feeding recording paper from the second paper cassette 52 below the first paper cassette 51, and a paper feeding path K3 for manually feeding recording paper from the upper rear of the apparatus.

The printer 1 also includes a first paper transport path FR1 that can transport the recording paper in a first direction (+Y direction) which is a paper transport path facing the recording head 9 and which is a paper transport direction when recording on the recording paper and in a second direction (−Y direction) opposite to the first direction as a paper transport path, a reverse path RR for reversing the surface of the recording paper, a second paper transport path FR2 for guiding the recording paper on which recording has been performed to the reverse path RR, and a third paper transport path FR3 that is positioned vertically below the second paper transport path FR2 and that guides the recording paper on which recording has been performed to the reversal path RR, which is different from the second paper transport path FR2.

In the embodiment, the first paper transport path FR1 is a paper transport path between the transport drive roller 16 and a first discharge drive roller 41. The second paper transport path FR2 is a paper transport path between the transport drive roller 16 and a driven roller 14a via a driven roller 14d. The third paper transport path FR3 is a paper transport path between a second discharge drive roller 47 and the driven roller 14a via a reverse drive roller 43. The reverse path RR is a paper transport path between the driven roller 14a and a driven roller 14c. In FIG. 2, reference numeral FR4 denotes a paper transport path (fourth paper transport path) between the driven roller 14c and the transport drive roller 16.

The recording paper is fed by a feeding roller 11 in the paper feeding path K1. The feeding roller 11 is supported by a support member 12 that swings about a swing shaft 12a, and the feeding roller 11 advances and retreats with respect to a recording paper P accommodated in the first paper cassette 51 by the swinging support member 12. The second paper cassette 52 (not shown in FIG. 2) provided under the first paper cassette 51 is also provided with a similar feeding mechanism (not shown).

The reverse roller 21 is formed to have the largest diameter as compared with other rollers and reverses the recording paper. The driven rollers 14a, 14b, 14c, and 14d is provided around the reverse roller 21. The recording paper fed through the paper feeding paths K1 and K2 is sent to the transport drive roller 16 through the reverse path RR and the fourth paper transport path FR4. The recording paper fed through the paper feeding path K3 is sent to the transport drive roller 16 through the fourth paper transport path FR4.

The recording paper sent along the −Y direction via the second paper transport path FR2 is sent to the transport drive roller 16 via the reverse path RR and the fourth paper transport path FR4. Similarly, the recording paper sent along the −Y direction via the third paper transport path FR3 is sent to the transport drive roller 16 via the reverse path RR and the fourth paper transport path FR4.

The recording paper sent to the transport drive roller 16 driven by a drive source (not shown) is nipped by the transport drive roller 16 and a transport driven roller 17 that is driven to rotate and is sent to an area facing the recording head 9, that is, a recording area, and recording is performed.

The carriage 8 including the recording head 9 reciprocates in the X-axis direction by a power source (not shown) while being guided by a carriage guide shaft 19 extending in the X-axis direction. The recording head 9 ejects ink onto the recording paper as the carriage 8 moves.

A support member 18 is provided at a position facing the recording head 9, and recording paper on which recording is performed by the recording head 9 is supported by the support member 18. Downstream of the support member 18, there are provided the first discharge drive roller 41 that is rotationally driven and a discharge driven roller 42 that is driven to rotate to send the recording paper on which recording is performed downstream. The first discharge drive roller 41 and the discharge driven roller 42 that is driven to rotate are a pair of rollers that are first positioned downstream of the recording head 9. Further downstream, the second discharge drive roller 47 that is rotationally driven and a discharge driven roller 48 that is driven to rotate are provided.

In the printer 1 including the above paper path, the feeding roller 11 and the reverse roller 21 are driven by a first motor (not shown), the transport drive roller 16 and the first discharge drive roller 41 are driven by a second motor (not shown), and the second discharge drive roller 47 and the reverse drive roller 43 are driven by a third motor (not shown).

Hereinafter, the second paper transport path FR2, the third paper transport path FR3, and the reverse path RR will be further described. When recording on a second surface of the recording paper on which recording is performed on a first surface thereof, the side opposite to the first surface, the recording paper on which recording has been performed is sent to the reverse path RR. As the paper transport path at that time, either the second paper transport path FR2 or the third paper transport path FR3 can be selected.

The path length of the third paper transport path FR3 is longer than the path length of the second paper transport path FR2, and a control unit (not shown) of the printer 1 has a paper length threshold. When the length of the recording paper exceeds the threshold, the third paper transport path FR3 is selected, and when the length of the recording paper is less than the threshold, the second paper transport path FR2 is selected.

When using the second paper transport path FR2, after the recording on the first surface is completed, the transport drive roller 16, the first discharge drive roller 41, and the second discharge drive roller 47 are reversed. As a result, the recording paper is transported along the −Y direction along the second sheet transport path FR2 and reaches the reverse path RR.

When using the third paper transport path FR3, after the recording on the first surface is completed, the paper is transported along the +Y direction until the trailing edge of the paper reaches a driven roller 49 provided in the vicinity upstream of the second discharge drive roller 47, and then the second discharge drive roller 47 is reversed. A flap 39 that can swing around a swing shaft 39a is provided upstream of the driven roller 49, and when recording paper is fed to the third paper transport path FR3, the +Y direction end of the flap 39 is raised upward. As a result, the recording paper is sent to the third paper transport path FR3 and sent to the reverse path RR.

The second discharge drive roller 47 and the reverse drive roller 43 obtain power from the third motor (not shown) which is a common drive source, but a rotation restricting mechanism (not shown) is provided in the power transmission path from the third motor to the reverse drive roller 43, and by this rotation restricting mechanism, the reverse drive roller 43 rotates in the direction of transporting the recording paper in the −Y direction (counterclockwise direction in FIG. 2) regardless of the rotation direction of the third motor. This rotation restricting mechanism can be constituted by a mechanism including a one-way clutch or a mechanism including a planetary gear mechanism, for example. On the other hand, the second discharge drive roller 47 rotates forward when the third motor rotates in the forward direction and reverses when the motor 45 rotates in the reverse direction.

Figure 3:
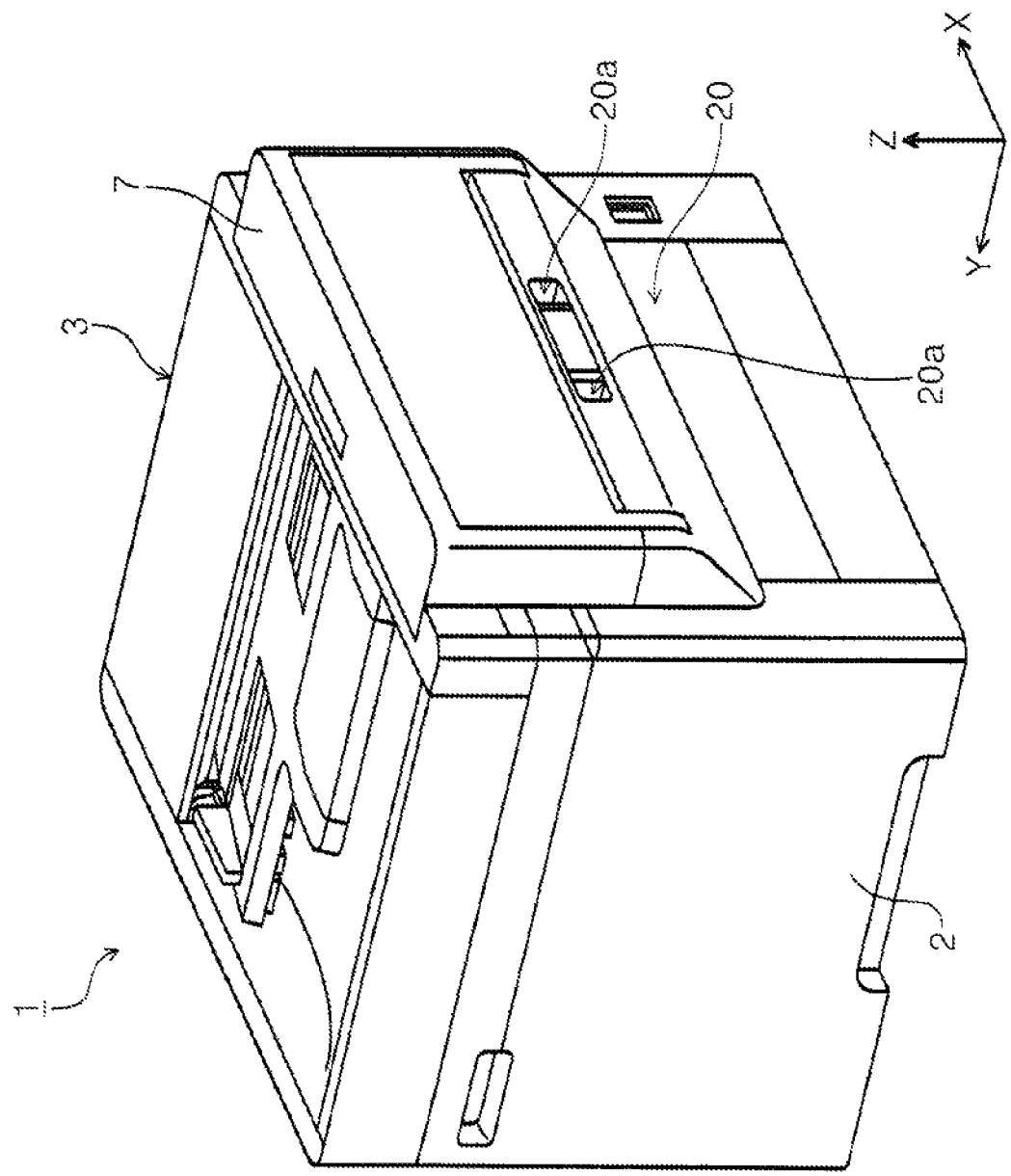
FIG. 3 is a perspective view of the printer as viewed from the rear and shows a state in which the unit body is mounted.
Figure 4:
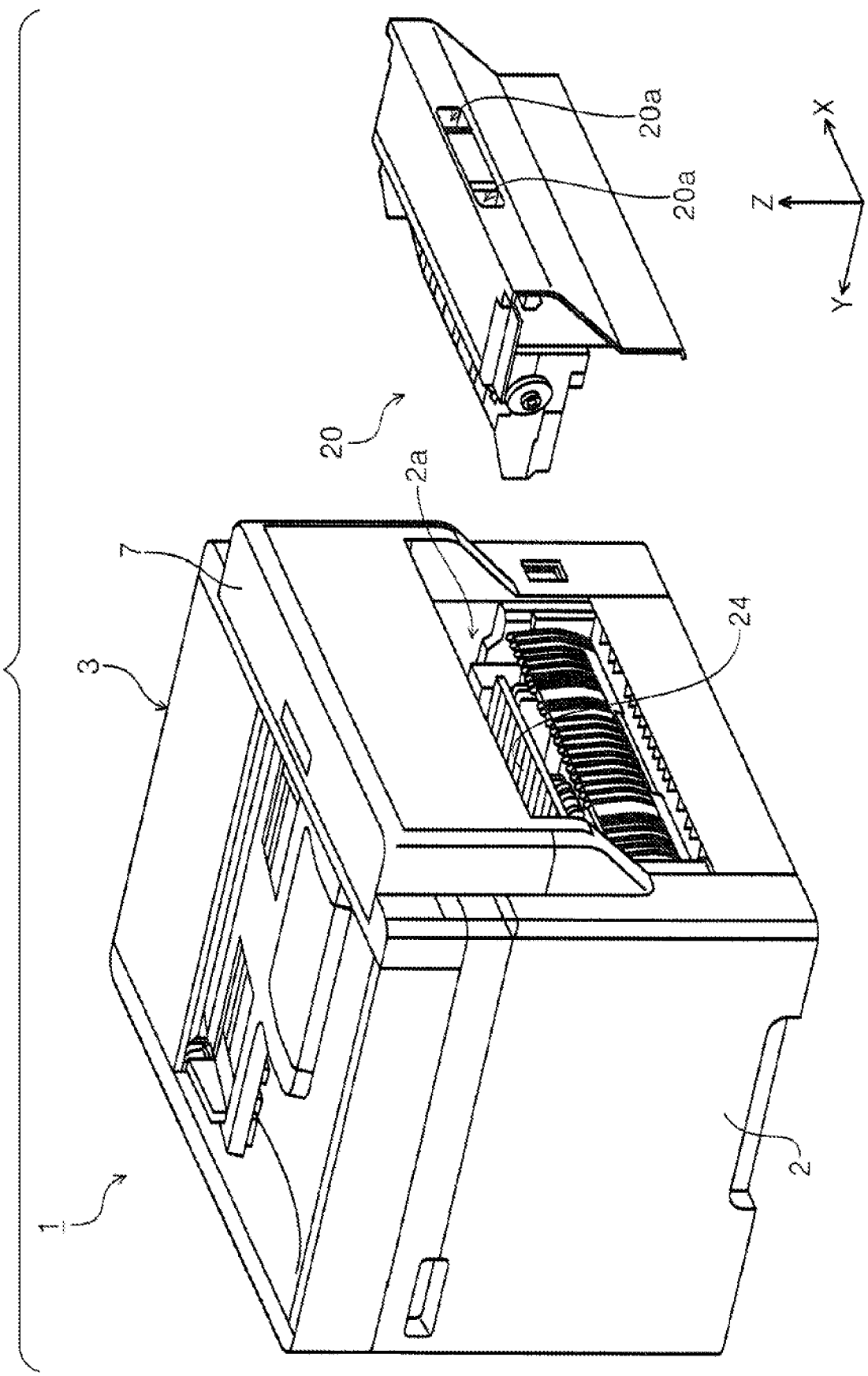
FIG. 4 is a perspective view of the printer as viewed from the rear and shows a state in which the unit body is pulled out.

Next, a unit body 20 provided on the back surface of the apparatus will be described. As shown in FIGS. 3 and 4, the unit body 20 is provided on the back of the apparatus so as to be attachable to and detachable from a mounting portion 2a of the apparatus main body 2. The mounting portion 2a can also be referred to as an opening for accommodating the unit body 20 in the apparatus main body 2, or an accommodating area or an accommodating space for accommodating the unit body 20. In the unit body 20, reference numeral 20a denotes a lock release unit. When the user presses the lock release unit 20a, the lock by a lock unit (not shown) is released, and the unit body 20 can be removed from the apparatus main body 2. In the embodiment, the unit body 20 can be removed from the apparatus main body 2, but the unit body 20 may not be removed from the apparatus main body 2 and may be provided so that the unit body 20 can be switched between a fully attached state and a drawn state.

Figure 5:
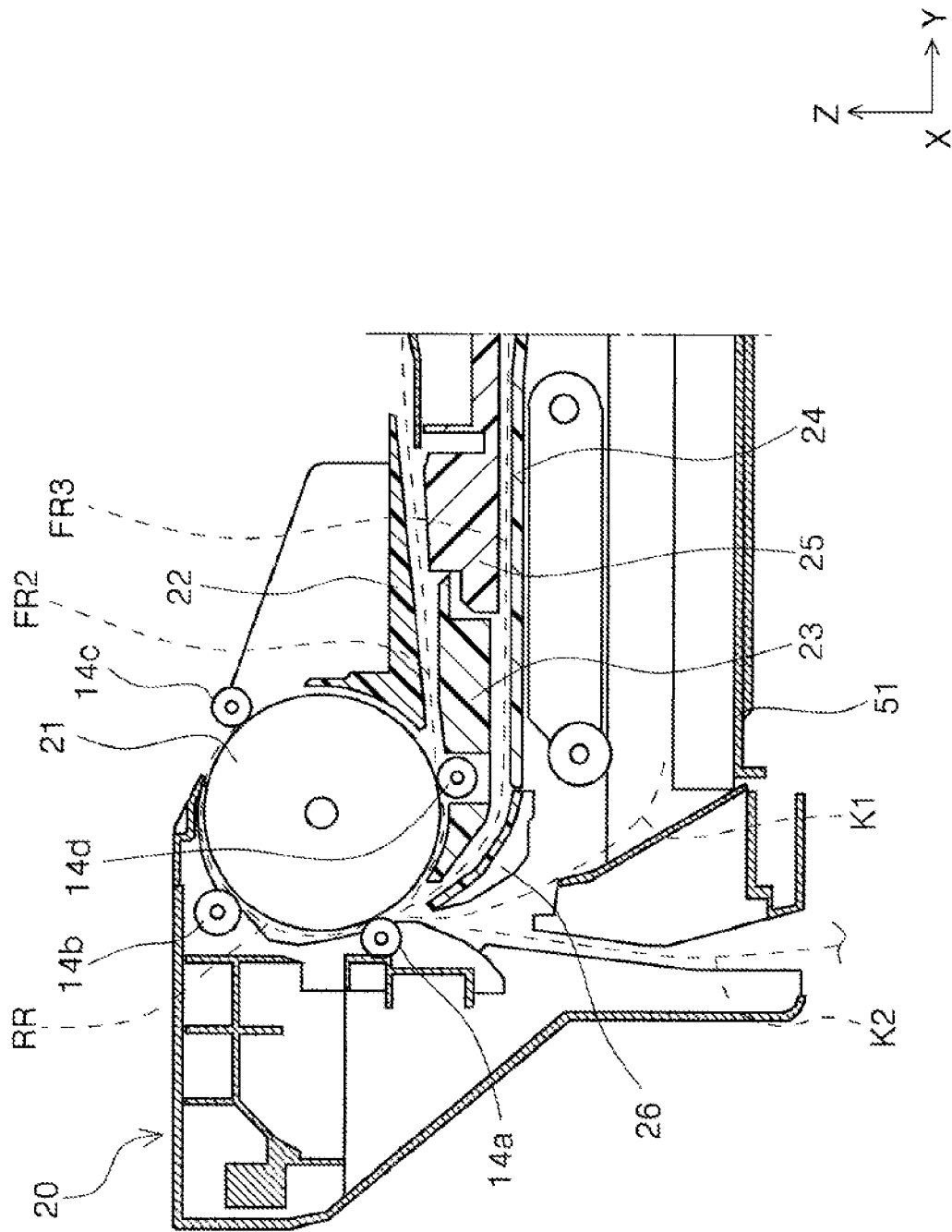
FIG. 5 is a side sectional view showing a part of the paper transport path of the printer and shows a state in which the unit body is mounted.
Figure 6:
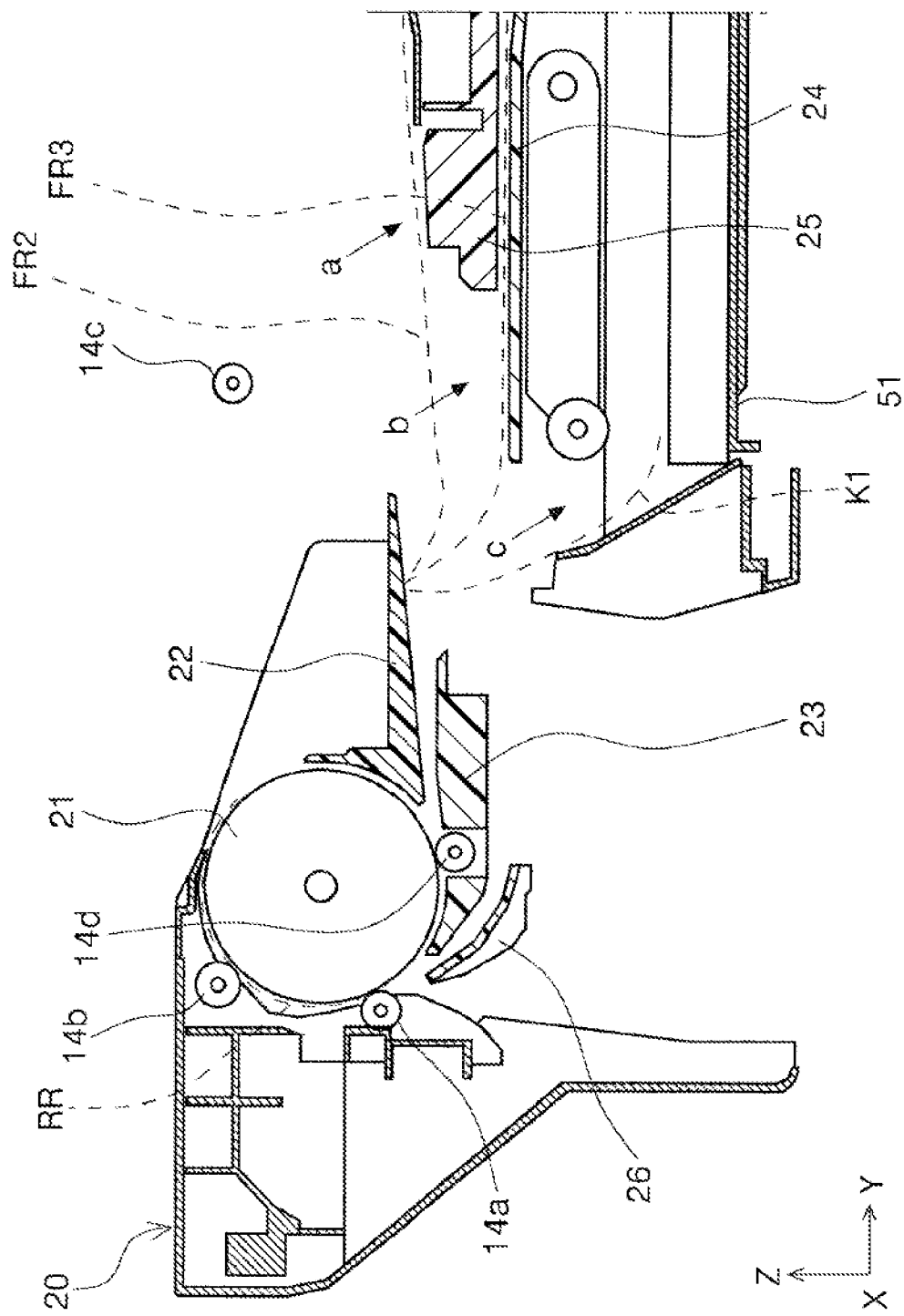
FIG. 6 is a side cross-sectional view showing a part of the paper transport path of the printer and shows a state in which the unit body is pulled out.

As shown in FIGS. 5 and 6, the unit body 20 includes a reverse roller 21 as a first path forming portion that forms the reverse path RR, and a second path forming portion 22 that forms a part of the upper side of the second paper transport path FR2, and a third path forming portion 23 that forms a part of the upper side of the third paper transport path FR3. Therefore, as shown in the change from FIGS. 5 and 6, when the unit body 20 is removed from the apparatus main body 2, a part of the second paper transport path FR2 and a part of the third paper transport path FR3 are exposed. When a paper jam occurs in the second paper transport path FR2 or the third paper transport path FR3, it can be quickly and easily recognized, and the jammed recording paper can be quickly and easily removed.

Hereinafter, members constituting the second paper transport path FR2 and the third paper transport path FR3 will be described in more detail. As shown in FIG. 5, a part of the upper side of the second paper transport path FR2 is formed by the second path forming portion 22, and a part of the lower side of the second paper transport path FR2 is formed by the third path forming portion 23. A fifth path forming portion 25 is coupled to the third path forming portion 23, and the third path forming portion 23 and the fifth path forming portion 25 form a part of the lower side of the second paper transport path FR2. The driven roller 14 d is provided so as to be rotatable with respect to the third path forming portion 23 and constitutes the unit body 20. In the embodiment, the driven rollers 14a and 14b also constitute the unit body 20.

The third path forming portion 23 and the fifth path forming portion 25 form a part of the upper side of the third paper transport path FR3. That is, the third path forming portion 23 and the fifth path forming portion 25 are common components of the second paper transport path FR2 and the third paper transport path FR3. A part of the lower side of the third paper transport path FR3 is formed by a sixth path forming portion 26 and a fourth path forming portion 24. Among these, the sixth path forming portion 26 forms the lower side of the portion coupled to the reverse path RR in the third paper transport path FR3.

Figure 7:
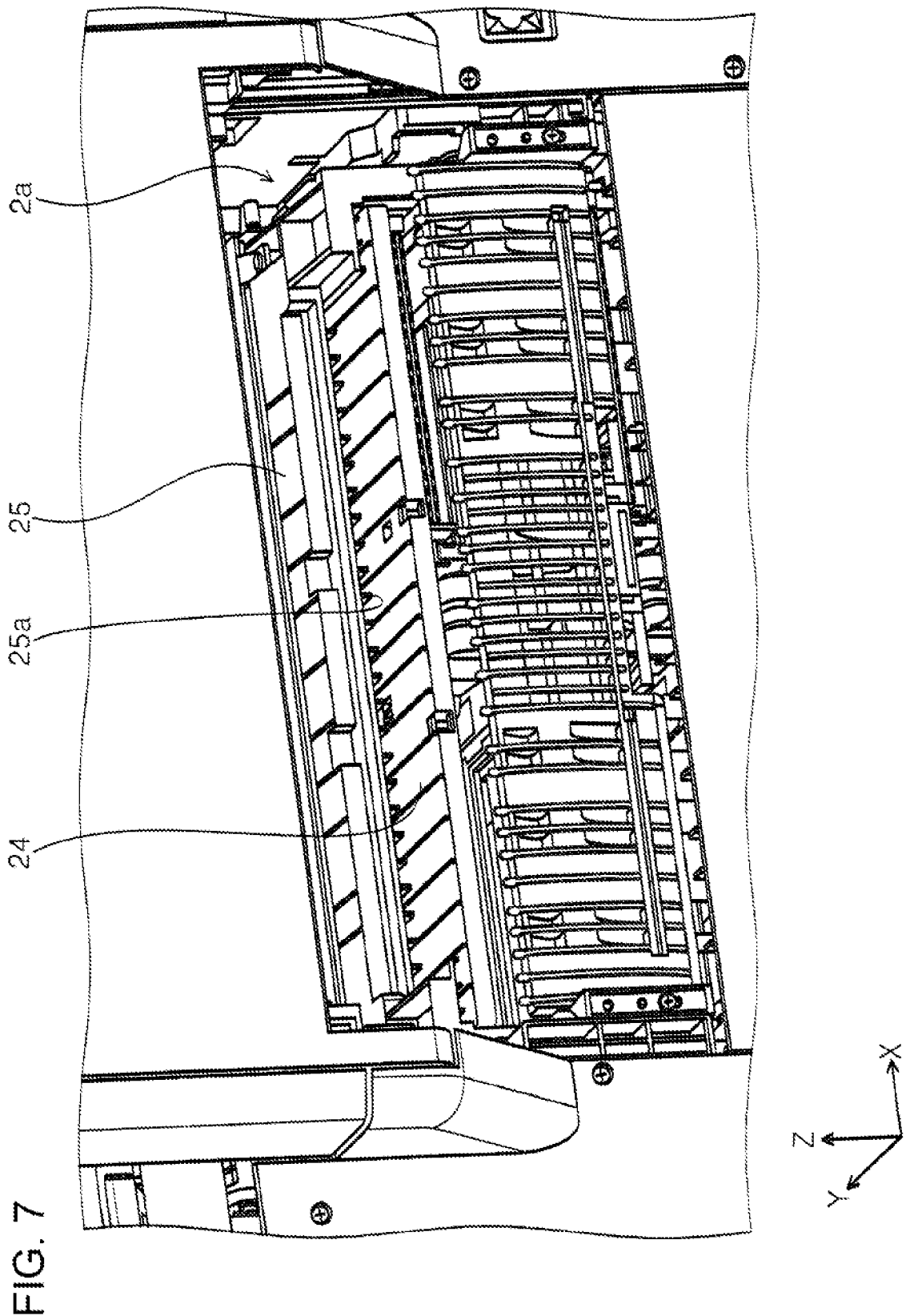
FIG. 7 is a perspective view showing a state in which a fourth path forming portion and a fifth path forming portion are exposed.

Among the components that form each paper transport path described above, the reverse roller 21 as the first path forming portion, the second path forming portion 22, the third path forming portion 23, and the sixth path forming portion 26 constitute the unit body 20. Accordingly, when the unit body 20 is removed, the fourth path forming portion 24 is exposed to the front side when viewed from the removing direction of the unit body 20 as shown in FIG. 6, that is, when viewed from the −Y direction to the +Y direction, and the fifth path forming portion 25 is exposed to the inner side, that is, in the +Y direction with respect to the fourth path forming portion 24 to be exposed. For this reason, the visibility of a part of the third paper transport path FR3 positioned below the second paper transport path FR2 is improved. In FIG. 6, an arrow a indicates a portion exposed in the fifth path forming portion 25. An arrow b indicates a portion exposed in the fourth path forming portion 24. As shown in the drawing, the portion a exposed in the fourth path forming portion 24 and the portion b exposed in the fifth path forming portion 25 form a stepped shape. This situation is also shown in FIG. 7.

In the embodiment, since the sixth path forming portion 26 that forms the lower side of the portion coupled to the reverse path RR in the third paper transport path FR3 constitutes the unit body 20, the sixth path forming portion 26 is also removed from the apparatus main body 2 by removing the unit body 20, and therefore it is possible to more easily check whether the recording paper is jammed in the third paper transport path FR3 and to easily remove the jammed recording paper.

In the embodiment, as shown in FIG. 2, the first paper cassette 51 that may accommodate recording paper and is attachable to and detachable from the apparatus main body 2 is provided vertically below the third paper transport path FR3. A seventh path forming portion 27 that forms a part of the lower side of the third paper transport path FR3 is provided at a position farther from the reverse path RR than the fourth path forming portion 24 vertically above the first paper cassette 51. The seventh path forming portion 27 is provided so as to be swingable by operating an end portion 27b in the +Y direction with a swing shaft 27a as a swing center, pulls out the discharge tray 6 from the apparatus main body 2, and can be displaced vertically downward in a state in which the first paper cassette 51 is removed from the apparatus main body 2. Thus, when the recording paper is jammed at a position farther from the reverse path RR than the fourth path forming portion 24 in the third paper transport path FR3, the jammed recording paper can be removed.

In the embodiment, by removing the unit body 20 from the apparatus main body 2, a part of the first paper cassette 51 is exposed. In FIG. 6, an arrow c indicates a portion where the first paper cassette 51 is exposed when the unit body 20 is removed from the apparatus main body 2. Thereby, when the recording paper is jammed while the recording paper is being fed out from the first paper cassette 51, the jam can be easily confirmed, and the jammed recording paper can be easily removed.

Figure 8:
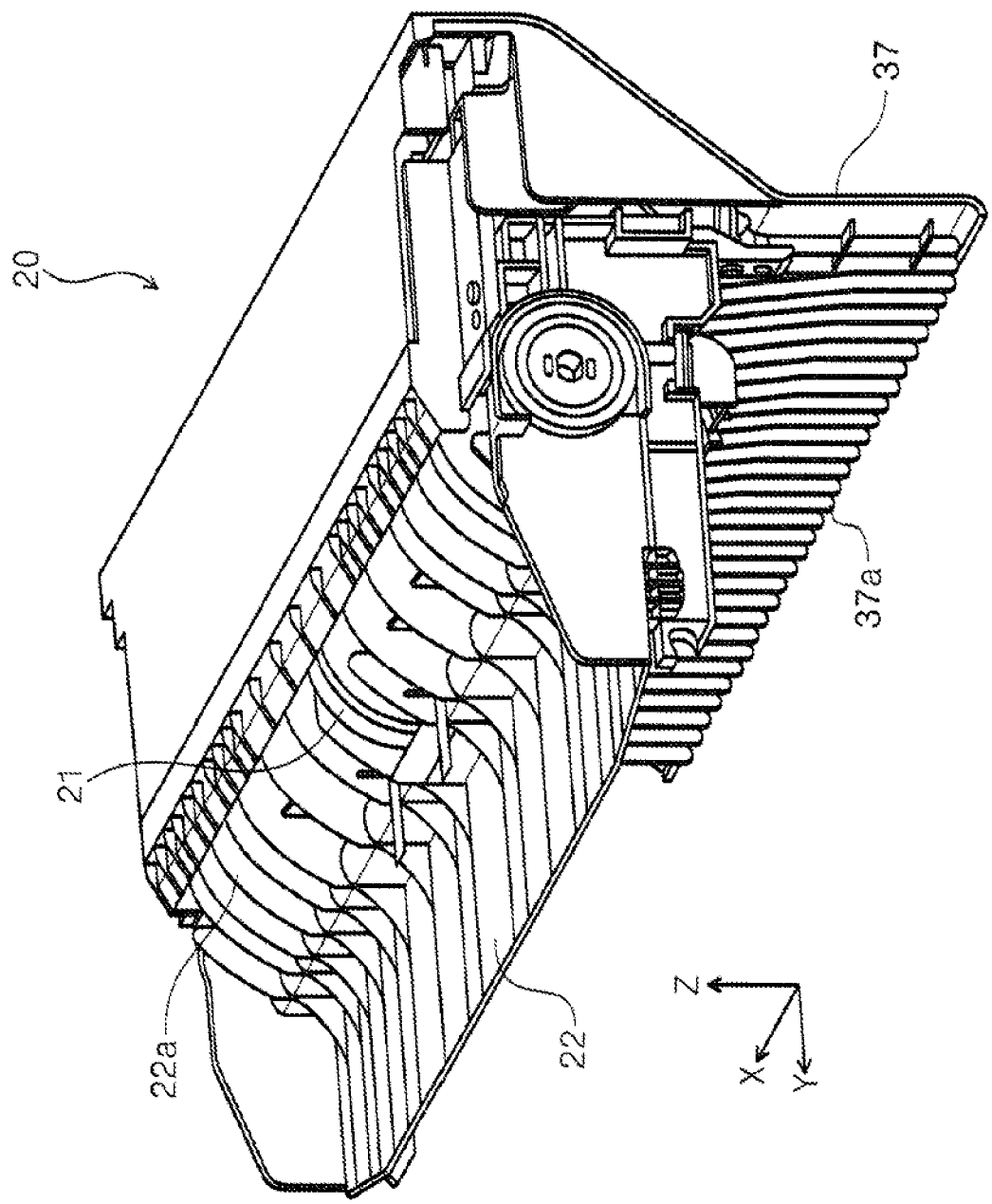
FIG. 8 is a perspective view of the unit body as viewed obliquely from above.

In the embodiment, the second path forming portion 22, the third path forming portion 23, the fourth path forming portion 24, the fifth path forming portion 25, the sixth path forming portion 26, and the seventh path forming portion 27 are members formed of a resin material, and ribs that extend in the paper transport direction are formed on the surface that forms each paper transport path at appropriate intervals in the width direction that is a direction that intersects the paper transport direction. For example, as shown in FIGS. 8 and 9, since the reverse path RR is formed by ribs 22a in the unit body 20, it is easy to visually recognize the jam of the recording paper occurring inside the reverse path RR, and the jammed recording paper can be easily removed if the interval between the adjacent ribs 22a is an interval at which a finger can be inserted. In FIG. 9, ribs 22b formed on the lower side of the second path forming portion 22 form a part of the upper side of the second paper transport path FR2. The ribs 23a formed on the lower side of the third path forming portion 23 form a part of the upper side of the second paper transport path FR2. Reference numeral 37 denotes a path forming portion that forms a part of the paper feeding path K2. Ribs 37a are also formed in the path forming portion 37, and the ribs 37a form a part of the paper feeding path K2. In this way, since the paper transport path is formed by the top portions of the ribs arranged at appropriate intervals along the width direction, which is the direction intersecting the paper transport direction, it is easy to visually recognize the jam of the recording paper occurring inside the path, and the jammed recording paper can be easily removed if the interval between the adjacent ribs is an interval at which a finger can be inserted.

The present disclosure is not limited to the embodiments described above, and various modifications are possible within the scope of the disclosure described in the claims, and it is needless to say that the modifications are also included in the scope of the present disclosure.

What is claimed is:

1. A recording apparatus comprising:
   a recording unit that performs recording on a medium;
   a first medium transport path that is a medium transport path facing the recording unit configured to transport a medium in a first direction that is a medium transport direction when recording is performed on the medium and in a second direction opposite to the first direction;
   a reverse path for reversing a surface of the medium;
   a second medium transport path for guiding the medium on which recording has been performed by the recording unit to the reverse path; and
   a third medium transport path separate from the second medium transport path, which is positioned vertically below the second medium transport path and so as to guide the medium on which recording has been performed by the recording unit to the reverse path independent of the second medium transport path, wherein
   a first path forming portion that forms the reverse path, a second path forming portion that forms a part of an upper side of the second medium transport path, and a third path forming portion that forms a part of an upper side of the third medium transport path are constituted to be attachable to and detachable from an apparatus main body including the recording unit as a unit body, and a part of the second medium transport path and the part of a third medium transport path are exposed by removing the unit body from the apparatus main body.

2. The recording apparatus according to claim 1, wherein the third path forming portion forms a part of a lower side of the second medium transport path, and by removing the unit body from the apparatus main body, a fourth path forming portion that forms a part of a lower side of the third medium transport path is exposed to the front side when viewed from a removing direction of the unit body, and a fifth path forming portion that forms a part of the lower side of the second medium transport path is exposed at a position inside with respect to the fourth path forming portion to be exposed.

3. The recording apparatus according to claim 2, further comprising:
   a sixth path forming portion that forms a lower side of a portion coupled to the reverse path in the third medium transport path, wherein
   the sixth path forming portion constitutes the unit body.

4. The recording apparatus according to claim 3, further comprising:
   a medium accommodating cassette that is positioned vertically below the third medium transport path and configured to accommodate a medium and is attachable to and detachable from the apparatus main body; and
   a seventh path forming portion that forms a part of the lower side of the third medium transport path and is farther from the reverse path than the fourth path forming portion, wherein
   the seventh path forming portion is displaceable downward in a state in which the medium accommodating cassette is removed from the apparatus main body.

5. The recording apparatus according to claim 3, further comprising:
   a medium accommodating cassette that is positioned vertically below the third medium transport path and configured to accommodate a medium and is attachable to and detachable from the apparatus main body, wherein
   a part of the medium accommodating cassette is exposed by removing the unit body from the apparatus main body.

6. The recording apparatus according to claim 1, wherein in the unit body, at least a part of the reverse path is formed by a plurality of ribs arranged at intervals in a width direction, which is a direction intersecting a feeding direction of the medium.

7. The recording apparatus according to claim 1,
   wherein the apparatus main body has an opening into which the unit body is inserted, and
   wherein the part of the second medium transport path and the part of a third medium transport path are exposed by the opening.

* * * * *